Patented Oct. 17, 1950

2,525,773

UNITED STATES PATENT OFFICE 2,525,773

CHLORINE ADDITION PRODUCT OF THIOPHENE

Harry L. Coonradt, Woodbury, and Howard D. Hartough, Pitman, N. J., assignors to Socony-Vacuum Oil Company, Incorporated, a corporation of New York No Drawing. Application November 13, 1948, Serial No. 59,982

8 Claims. (Cl. 260—329)

This invention relates to a new composition of matter, namely, a chlorine addition product of thiophene characterized by the molecular formula $C_4H_4Cl_4S$ and by a melting point of 44.5–46° C. The invention is further concerned with a method for synthesizing this new compound.

The direct reaction between thiophene and chlorine is well known in the art and proceeds easily and rapidly under normal conditions to yield a thiophene-halogen reaction mixture comprising unreacted thiophene, monochlorothiophene, dichlorothiophene, trichlorothiophene, tetrachlorothiophene, and addition products of thiophene.

To obtain a clear-cut separation of the various chlorothiophenes, the method developed over sixty years ago and accredited to Victor Meyer has heretofore generally been employed. This method involves heating the crude chlorination reaction mixture with alcoholic potassium hydroxide for several hours, followed by addition of water and subsequent steam distillation and fractionation of the mixture so obtained to yield the various chlorothiophenes. The aforesaid treatment with alcoholic potassium hydroxide has heretofore destroyed the addition products of thiophene formed during the course of the chlorination reaction.

In copending application Serial Number 59,973, filed on November 13, 1948, there is disclosed a new chemical compound, tetrachlorothiolane, obtained upon chlorination of thiophene under particularly defined conditions, followed by chilling of the resulting reaction mixture to a temperature at which crystallization takes place. In accordance with the present invention, it has now been discovered that a chlorine addition product of thiophene can be obtained from the chlorinated thiophene reaction mixture remaining after the isolation therefrom of the aforesaid tetrachlorothiolane. The new compound so obtained has a molecular formula $C_4H_4Cl_4S$, a melting point of 44.5–46° C. and a boiling point of 105° C. at a pressure of 4.5 millimeters of mercury.

This new compound is produced by treating thiophene under controlled conditions of temperature with less than 4 moles of chlorine per mole of thiophene and thereafter removing crystals of tetrachlorothiolane from the reaction mixture and fractionating the remaining chlorination mixture, preferably under reduced pressure, to obtain a fraction boiling at a temperature corresponding to about 105° C. at a pressure of 4.5 millimeters of mercury. Crystallization of this fraction yielded a white solid crystalline compound which has been found to have the following analysis:

| | Found | Theoretical for $C_4H_4Cl_4S$ |
|---|---|---|
| Carbon | 21.26 | 21.26 |
| Hydrogen | 1.87 | 1.79 |
| Chlorine | 62.9 | 62.76 |
| Sulfur | 14.2 | 14.19 |

An infra-red absorption spectrum of a saturated solution of the compound in carbon tetrachloride showed no evidence of unsaturation characteristic of the thiophene nucleus and no olefinic bonds.

The product having the above properties is isolated from a chlorinated thiophene reaction mixture prepared by treating thiophene under controlled conditions of temperature with less than 4 moles of chlorine per mole of thiophene, removing tetrachlorothiolane from the resulting product mixture and thereafter fractionating said mixture to yield the above described chlorine addition product of thiophene.

In synthesizing the compound of this invention, the molar ratio of chlorine to thiophene is generally between about 0.5 and about 3. The yield of product using smaller amounts of chlorine than the above results in low yields of the desired compound, while the presence of an excess of chlorine, that is, 4 moles of chlorine per mole of thiophene or greater amounts, fails to yield any of the desired compound. Under the usual operating conditions, the amount of chlorine employed will accordingly be between about 1 and about 3 moles of chlorine per mole of thiophene.

The temperature at which chlorination is effected may extend from −30° C. to reflux temperature in the approximate range of 80–110° C. At the completion of chlorination, tetrachlorothiolane is removed from the reaction mixture by filtration, centrifuging or other suitable means and the resulting mixture is thereafter fractionated, preferably under reduced pressure to yield the compound of this invention. It is essential that tetrachlorothiolane (M. P. 111.5–113.5° C.) be removed from the reaction mixture before the thiophene-chlorine addition product described herein (M. P. 44.5–46° C.) can be obtained from the remaining mixture; otherwise, upon attempted fractionation, decomposition of the entire mixture ensues and none of the desired compound can thus be realized.

Tetrachlorothiolane may be separated from the chlorinated thiophene reaction mixture produced under the above described conditions either by cooling the mixture to a temperature below 0° C., and preferably in the range of −30° C. to −70° C., at which crystallization takes place, and removing the resulting crystals of tetrachlorothiolane or by topping the chlorinated thiophene mixture to a temperature of about 150° C. and thereafter crystallizing tetrachlorothiolane from the residue. The crystals of tetrachlorothiolane so obtained are removed from the reaction mixture by filtration, centrifuging or other suitable means. If the chlorinated thiophene reaction mixture is first topped, as described above, crystallization of tetrachlorothiolane will be found to occur even at ordinary temperatures merely upon permitting the resulting mixture to stand. However, as the temperature is lowered, the rate of crystallization becomes more rapid to yield well defined crystals of tetrachlorothiolane. After removal of the crystalline tetrachlorothiolane, the reaction mixture is fractionated to give the thiophene-chlorine addition compound of this invention.

The product described herein is useful as an intermediate in the manufacture of dyes, insecticides, and resins and in the synthesis of other valuable chemical compounds.

The following examples will serve to illustrate the compound and process of the present invention without limiting the same:

*Example 1*

Ten moles of thiophene (840 grams) were reacted with 10 moles of gaseous chlorine. The reaction mixture was maintained at the reflux temperature, which rose from 84° C. to 102° C. during chlorination, which extended over a period of two hours. At the completion of chlorination, a stream of nitrogen was passed through the hot mixture for 45 minutes. The mixture was then washed with water, a 5 per cent aqueous solution of sodium carbonate and finally with water again. The mixture was dried with sodium sulfate and thereafter distilled until the vapor temperature reached 150° C. Hydrogen chloride was evolved during the distillation. The residue resulting from said distillation was placed in a vessel which was permitted to stand at room temperature (approximately 25° C.) for a period of one month. Crystals which formed during this period were removed by filtration. The crude crystals had a melting point of 110–114.5° C. After recrystallization, a mixed melting point determination with a previously identified sample of tetrachlorothiolane showed no depression. The filtrate remaining after removal of the above crystals was fractionated under reduced pressure. A fraction having a boiling point of 105° C. at 4.5 mm. of mercury was obtained in the amount of 34 grams. This material after recrystallization from ASTM naphtha had a melting point of 45–46° C. and a refractive index $n_D^{50}$ of 1.5688. Infra-red absorption spectra and chemical analysis showed the compound to be a chlorine addition product of thiophene having the formula $C_4H_4Cl_4S$.

*Example 2*

Ten moles of thiophene (840 grams) were reacted with an equimolar amount of gaseous chlorine. The temperature of the reaction mixture was maintained somewhat below the reflux temperature and rose from 50° C. to 100° C. during chlorination, which extended over a period of two hours. At the completion of chlorination, a stream of nitrogen was passed through the hot reaction mixture for 40 minutes. The mixture was then washed with water, a 5 per cent aqueous solution of sodium carbonate and finally with water again. The mixture was dried with sodium sulfate and thereafter distilled until the vapor temperature reached 150° C. Hydrogen chloride was evolved during the distillation. The residue of 404 grams was divided into two equal portions and processed by different methods.

One-half of the residue (202 grams) was fractionated directly under reduced pressure without prior removal of tetrachlorothiolane therefrom. When the distillation temperature rose above that of the chlorothiophenes, vigorous decomposition occurred to yield a black tarry residue from which only 7 grams of crude tetrachlorothiolane with a melting point of 107–112° C. were obtained. None of the desired thiophene-chlorine addition product (M. P. 44.5–46° C.) was obtained.

The other half of the residue (202 grams) was kept at a temperature of −20° F. overnight (about 18 hours) and then at room temperature for one day (24 hours). The crystals that formed were separated by filtration to yield 25 grams of crude tetrachlorothiolane (M. P. 105–110° C.). The filtrate was fractionated under reduced pressure to yield 47 grams of a product boiling within the range 110–118° C. at a pressure of 5 mm. of mercury. Recrystallization of this material from ASTM naphtha yielded crystals having a melting point of 44–48.5° C. The crystals so obtained were found to have the composition $C_4H_4Cl_4S$.

From the foregoing example, it will be seen that removal of tetrachlorothiolane (M. P. 111.5° C.–113.5° C.) from the chlorinated thiophene reaction mixture is an essential preliminary step in order that the thiophene-chlorine addition product of this invention may be isolated from the reaction mixture. In the absence of such preliminary removal of tetrachlorothiolane, decomposition of the chlorinated thiophene mixture takes place and none of the desired compound is thereby obtained.

We claim:

1. A method for preparing a chlorine addition product of thiophene characterized by the molecular formula $C_4H_4Cl_4S$ and by a melting point of 44.5–46° C., which comprises reacting thiophene with less than 4 moles of chlorine per mole of thiophene, removing tetrachlorothiolane having a melting point of 111.5–113.5° C. from the resulting reaction product mixture, distilling the remaining mixture under reduced pressure and collecting the fraction having a boiling point corresponding to about 105° C. at a pressure of 4.5 millimeters of mercury.

2. A method for preparing a chlorine addition product of thiophene characterized by the molecular formula $C_4H_4Cl_4S$ and by a melting point of 44.5–46° C., which comprises reacting thiophene with between about 0.5 and about 3 moles of chlorine per mole of thiophene, cooling the resulting reaction product liquid to a temperature at which crystallization of tetrachlorothiolane, having a melting point of 111.5–113.5° C., takes place, removing the resulting crystals from the reaction product mixture, distilling the remaining mixture under reduced pressure and collecting the fraction having a boiling point corresponding to about 105° C. at a pressure of 4.5 millimeters of mercury.

3. A method for preparing a chlorine addition product of thiophene characterized by the molecular formula $C_4H_4Cl_4S$ and by a melting point of 44.5–46° C., which comprises reacting thiophene with between about 0.5 and about 3 moles of chlorine per mole of thiophene at a temperature between about −30° C. and reflux, crystallizing tetrachlorothiolane, having a melting point of 111.5–113.5° C., from the resulting reaction product liquid, removing the crystals so obtained from the reaction product mixture by filtration, distilling the filtrate under reduced pressure and collecting the fraction having a boiling point corresponding to about 105° C. at a pressure of 4.5 millimeters of mercury.

4. A method for preparing a chlorine addition product of thiophene characterized by the molecular formula $C_4H_4Cl_4S$ and by a melting point of 44.5–46° C., which comprises reacting approximately equimolar quantities of thiophene and chlorine at a temperature between about −30° C. and reflux, crystallizing tetrachlorothiolane, having a melting point of 111.5–113.5° C. from the resulting reaction product liquid, removing the crystals so obtained from the reaction product mixture by filtration, distilling the filtrate under reduced pressure and collecting the fraction having a boiling point corresponding to about 105° C. at a pressure of 4.5 millimeters of mercury.

5. A method for preparing a chlorine addition product of thiophene characterized by the molecular formula $C_4H_4Cl_4S$ and by a melting point of 44.5–46° C., which comprises reacting thiophene with between about 0.5 and about 3 moles of chlorine per mole of thiophene, topping the resulting reaction product mixture to drive off hydrogen chloride contained therein, crystallizing tetrachlorothiolane, having a melting point of 111.5–113.5° C., from the treated mixture, removing the crystals so obtained from the reaction product mixture and distilling the remaining mixture under reduced pressure and collecting the fraction having a boiling point corresponding to about 105° C. at a pressure of 4.5 millimeters of mercury.

6. A method for preparing a chlorine addition product of thiophene characterized by the molecular formula $C_4H_4Cl_4S$ and by a melting point of 44.5–46° C., which comprises reacting thiophene with between about 0.5 and about 3 moles of chlorine per mole of thiophene at a temperature between about −30° C. and reflux, topping the resulting product mixture to drive off hydrogen chloride contained therein, crystallizing tetrachlorothiolane, having a melting point of 111.5–113.5° C., from the treated mixture, removing the crystals so obtained from the reaction product mixture by filtration, distilling the filtrate under reduced pressure and collecting the fraction having a boiling point corresponding to about 105° C. at a pressure of 4.5 millimeters of mercury.

7. A method for preparing a chlorine addition product of thiophene characterized by the molecular formula $C_4H_4Cl_4S$ and by a melting point of 44.5–46° C., which comprises reacting approximately equimolar quantities of thiophene and chlorine at a temperature between about −30° C. and reflux, topping the resulting product mixture to drive off hydrogen chloride contained therein, crystallizing tetrachlorothiolane, having a melting point of 111.5–113.5° C., from the treated mixture, removing the crystals so obtained from the reaction product mixture by filtration, distilling the filtrate under reduced pressure and collecting the fraction having a boiling point corresponding to about 105° C. at a pressure of 4.5 millimeters of mercury.

8. As a new composition of matter, a chlorine addition product of thiophene having the following characteristics:

Molecular formula _____ $C_4H_4Cl_4S$
Melting point _____ 44.5–46° C.
Boiling point at 4.5 mm. Hg _____ 105° C.
Refractive index $N_D^{50}$ _____ 1.5688

HARRY L. COONRADT.
HOWARD D. HARTOUGH.

REFERENCES CITED

The following references are of record in the file of this patent:

OTHER REFERENCES

Coonradt, J. Am Chem. Soc., 70, 1158–61 (1948).
Steinkopf, "Die Chemie des Thiophens," Dresden, 1941, pages 35 and 38.